US012811165B2

(12) United States Patent
Vivekananthan et al.

(10) Patent No.: US 12,811,165 B2
(45) Date of Patent: Nov. 24, 2026

(54) LAYER SYSTEM FOR COATING A BIPOLAR PLATE, BIPOLAR PLATE, AND FUEL CELL

(71) Applicant: Schaeffler Technologies AG & Co. KG, Herzogenaurach (DE)

(72) Inventors: Jeevanthi Vivekananthan, Herzogenaurach (DE); Nazlim Bagcivan, Nuremberg (DE); Ricardo Henrique Brugnara, Heesdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 892 days.

(21) Appl. No.: 17/617,195

(22) PCT Filed: May 11, 2020

(86) PCT No.: PCT/DE2020/100395
§ 371 (c)(1),
(2) Date: Dec. 7, 2021

(87) PCT Pub. No.: WO2020/249154
PCT Pub. Date: Dec. 17, 2020

(65) Prior Publication Data

US 2022/0246950 A1 Aug. 4, 2022

(30) Foreign Application Priority Data

Jun. 12, 2019 (DE) ......................... 102019116000.6

(51) Int. Cl.
*H01M 8/0228* (2016.01)
*C22C 14/00* (2006.01)
(Continued)

(52) U.S. Cl.
CPC ........... *H01M 8/0228* (2013.01); *C22C 14/00* (2013.01); *H01M 8/0208* (2013.01); *H01M 2004/8694* (2013.01)

(58) Field of Classification Search
CPC ............. H01M 8/0228; H01M 8/0208; H01M 2004/8694; H01M 8/1018; H01M 8/023;
(Continued)

(56) References Cited

U.S. PATENT DOCUMENTS 5,912,088 A * 6/1999 Ernst .................. H01M 8/0271 429/479
6,740,393 B1 * 5/2004 Massler ................ C23C 28/044 428/408
(Continued)

FOREIGN PATENT DOCUMENTS

CA 3073697 2/2019
CN 108977766 * 12/2018 ............ C23C 14/06
(Continued)

OTHER PUBLICATIONS

Zeng et al. "Diamond-like carbon (DLC) films as electrochemical electrodes." Diamond & Related Materials 43 (2014) 12-22 (Year: 2014).*

(Continued)

*Primary Examiner* — Michael L Dignan
(74) *Attorney, Agent, or Firm* — Volpe Koenig

(57) ABSTRACT

A layer system (1, 1', 1", Ia) for coating a bipolar plate (10) or an electrode unit (10*a,* 10*b*), including at least one first layer (2, 2*a,* 2*b*), at least one second layer (3), and at least one cover layer (4, 4*a,* 4*b*) arranged on the at least one second layer (3) made of a doped tetrahedral amorphic carbon ta-C:X, wherein as the dopant X, at least one element is provided from the group including titanium, niobium, tungsten, zirconium, tantalum, hafnium, molybdenum, copper, silicon, platinum, palladium, ruthenium, iridium, silver, boron, nitrogen, phosphor, fluorine, hydrogen, and oxygen, and the dopant X is provided in the cover layer (4, 4*a,* 4*b*) in a concentration of >0 to 20 at.-%. A bipolar plate (10) or an electrode unit (10*a,* 10*b*) having such a layer system and
(Continued)

a fuel cell (100) and a redox flow cell (110) are also provided.

20 Claims, 4 Drawing Sheets

(51) Int. Cl.
*H01M 8/0208* (2016.01)
*H01M 4/86* (2006.01)

(58) Field of Classification Search
CPC ........... H01M 8/20; H01M 8/22; C22C 14/00; Y02A 40/25; Y02E 60/50
See application file for complete search history.

(56) References Cited

U.S. PATENT DOCUMENTS

| | | | | |
|---|---|---|---|---|
| 2004/0005502 | A1 | 1/2004 | Schlag | |
| 2011/0229800 | A1 | 9/2011 | Jeom et al. | |
| 2013/0230793 | A1 * | 9/2013 | Wang | C23C 4/18 427/126.3 |

FOREIGN PATENT DOCUMENTS

| | | | | | |
|---|---|---|---|---|---|
| DE | 10230395 | | | 1/2004 | |
| DE | 102010045557 | A1 | | 4/2011 | |
| DE | 102016111224 | A1 | | 8/2017 | |
| EP | 2817430 | B1 | | 12/2018 | |
| JP | 2010/129394 | | * | 6/2010 | H01M 8/02 |
| JP | 2010129394 | A | | 6/2010 | |
| JP | 2017021907 | | | 1/2017 | |
| JP | 2017075389 | A | | 4/2017 | |
| KR | 20130055151 | A | | 5/2013 | |
| KR | 10-2013-0129621 | | * | 11/2013 | H01M 8/02 |
| KR | 20130129621 | | | 11/2013 | |
| KR | 20130129621 | A | | 11/2013 | |
| WO | 2013124690 | | | 8/2013 | |
| WO | 2015124736 | A2 | | 8/2015 | |

OTHER PUBLICATIONS

KR 10-2013-0129621 machine English translation (Year: 2013).*
JP 2010/129394 machine English translation (Year: 2010).*
Bi et al. "Effect of Si/O doping on the thermal stability of non-bonded hydrogenated diamondlike carbon coatings." Surface & Coatings Technology 374 (2019) 1006-1014 (Year: 2019).*
CN 108977766 machine English translation (Year: 2018).*
Dai et al. "Compositionally modulated multilayer diamond-like carbon coatings with AlTiSi multi-doping by reactive high power impulse magnetron sputtering." Applied Surface Science 425 (2017) 855-861 (Year: 2017).*
Fuel Cell Handbook (Seventh Edition) by EG&G Technical Services, Inc., Nov. 2004, p. 91, 3-4.
VDI Guideline 2840 published Jun. 2012.

* cited by examiner

LAYER SYSTEM FOR COATING A BIPOLAR PLATE, BIPOLAR PLATE, AND FUEL CELL

CROSS-REFERENCE TO RELATED APPLICATIONS

This application is the U.S. National Phase of PCT Appln. No. PCT/DE2020/100395, filed May 11, 2020, which claims priority from German Patent Application No. 10 2019 116 000.6, filed Jun. 12, 2019, the entire disclosures of which are incorporated by reference herein.

TECHNICAL FIELD

The disclosure relates to a layer system for coating a bipolar plate or electrode unit comprising a doped diamond-like carbon layer. The disclosure further relates to a bipolar plate having such a layer system and a fuel cell formed with at least one such bipolar plate. The disclosure further relates to an electrode unit having such a layer system and a redox flow cell formed with at least one such electrode unit.

Bipolar plates and fuel cells are already known from DE 102 30 395 A1. This bipolar plate has a metallic substrate that is provided with a doped diamond coating and/or a doped diamond-like carbon coating.

Metallic substrates are used for the formation of bipolar plates of fuel cells due to their good mechanical stability and high electrical and thermal conductivity. Under the aggressive operating conditions in a fuel cell, however, corrosion and dissolution of the metallic substrate often occur so that coatings protecting against corrosion are applied to increase the long-term stability of the bipolar plates. In the case of unfavorable operating conditions of the fuel cell, however, damage occurs again and again in the region of such coatings, so that the protection of the metallic substrate is lost at least locally and corrosion of the metallic substrate nevertheless sets in with a time delay.

SUMMARY

It is therefore the object of the disclosure to provide a layer system for a bipolar plate or electrode unit that is inexpensive to manufacture and that protects a metallic substrate from corrosion. A further object of the disclosure is to provide a bipolar plate formed therewith and a fuel cell with such a bipolar plate and to provide an electrode unit and a redox flow cell formed with at least one such electrode unit.

The object is achieved for the layer system for coating a bipolar plate or electrode unit in that it is designed to comprise at least one first layer, at least one second layer and at least one cover layer which is arranged on the at least one second layer in particular and is made of doped, tetrahedral amorphous carbon ta-C:X, wherein as the dopant X, at least one element is provided from the group comprising titanium, niobium, tungsten, zirconium, tantalum, hafnium, molybdenum, copper, silicon, platinum, palladium, ruthenium, iridium, silver, boron, nitrogen, phosphorus, fluorine, hydrogen, and oxygen, and wherein the dopant X is provided in the cover layer in a concentration of >0 to 20 at. %.

The layer system is characterized by high long-term stability with simultaneously high electrical conductivity and low cost. In addition, the layer system ensures excellent corrosion protection for a metallic base material or a metallic substrate of a bipolar plate or electrode unit.

The cover layer of doped, tetrahedral amorphous carbon ta-C:X has predominantly $sp^3$-hybridized bonds. A tetrahedral amorphous carbon ta-C is understood here if the $sp^3$-hybridized proportion in the cover layer is more than 50%.

The at least one first layer of the layer system is preferably a metallic layer that is formed from at least one element from the group consisting of titanium, niobium, hafnium, zirconium, and tantalum. In particular, the at least one first layer is formed from a titanium-niobium alloy. The titanium-niobium alloy preferably has a niobium content in the range from 20 to 60 at. %.

There can be a plurality of such first layers, which can have the same or different compositions.

The at least one second layer of the layer system is preferably a metallic layer doped with at least one non-metal, which is formed from at least one element from the group consisting of titanium, niobium, hafnium, zirconium, and tantalum, and wherein the at least one non-metal is formed from at least one element from the group comprising nitrogen, carbon, fluorine, boron, hydrogen, oxygen.

There can be a plurality of such second layers that can have the same or different compositions.

In addition, first layers and second layers can be arranged alternately on top of one another.

There can also be a plurality of such cover layers that can have the same or different compositions.

A number n of first layers or second layers or cover layers can thus each be in the range from n≥2 to 100.

A cover layer made of ta-C:X is preferred, wherein the dopant X is formed from hydrogen and/or oxygen and is provided in an amount in the range from 0.1 to 10 at. %.

A cover layer made of ta-C:X is particularly preferred, wherein the dopant X is formed from tantalum or iridium or ruthenium, and is provided in an amount in the range from 0.1 to 20 at. %.

The layer system comprising at least one metallic first layer and at least one metallic second layer as well as the at least one cover layer can be produced with a low electrical contact resistance of less than 30 $m\Omega \cdot cm^2$, so that a high electrical conductivity results.

The at least one first layer, the at least one second layer, and the at least one cover layer are preferably formed by means of physical vapor deposition (PVD). In particular, deposition by means of arc evaporation and/or sputtering is preferred here. However, a use of other deposition techniques such as chemical vapor deposition (CVD) is also possible, alone or in combination with a PVD process. The use of plasma-assisted CVD processes (PACVD) has also proven itself.

The at least one first layer and/or the at least one second layer preferably have/has a layer thickness in the range from 20 nm to 900 nm.

The at least one cover layer preferably has a coating thickness in the range of from 5 nm to 4.5 μm. In this way, the material requirement for the layer system can be minimized and sufficient corrosion protection for a metallic substrate simultaneously having good electrical properties can be achieved.

The object is achieved for a bipolar plate having an anode side and a cathode side, comprising a substrate and a layer system according to the disclosure, having a structure of the bipolar plate in the following order: (a) metallic substrate, (b) optionally a gas diffusion layer, (c) at least one first layer, (d) at least one second layer, (e) optionally in an alternating arrangement of first layers and second layers, (f) at least one cover layer.

The layer system can be on the anode side and/or the cathode side of the bipolar plate. In the case of a plurality of first layers and a plurality of second layers, these can be arranged either one after the other, i.e., first all first layers and then all second layers, or alternately, i.e., one or more first layers and one or more second layers alternately on top of one another.

A substrate made of stainless steel, preferably austenitic stainless steel, of titanium, a titanium alloy, aluminum, an aluminum alloy or a magnesium alloy is particularly preferred as the metallic substrate of a bipolar plate.

An optionally present gas diffusion layer is designed to be electrically conductive.

The object is also achieved for a fuel cell, in particular an oxygen-hydrogen fuel cell, or an electrolyzer, in that this is designed to comprise at least one bipolar plate according to the disclosure.

The fuel cell preferably comprises at least one polymer electrolyte membrane. The fuel cell can therefore be a high or low temperature polymer electrolyte fuel cell.

The object is also achieved for the electrode unit, comprehensively in the order: (a) a metallic substrate, (b) at least one first layer, (c) at least one second layer, (d) optionally in an alternating arrangement of first layers and second layers, (e) at least one cover layer.

A substrate made of stainless steel, preferably austenitic stainless steel, of titanium, a titanium alloy, aluminum, an aluminum alloy or a magnesium alloy is particularly preferred as the metallic substrate of the electrode unit.

The object is also for the redox flow cell, comprising at least one electrode unit according to the disclosure, a first reaction space and a second reaction space, wherein each reaction space is in contact with one electrode unit and wherein the reaction spaces are separated from one another by a polymer electrolyte membrane.

BRIEF DESCRIPTION OF THE DRAWINGS

FIG. 1 shows a first layer system on a metallic substrate

FIG. 2 shows a second layer system on a metallic substrate

FIG. 3 shows a third layer system on a metallic substrate

FIG. 4 shows a fourth layer system on a metallic substrate having a gas diffusion layer FIG. 5 shows a bipolar plate with a layer system FIG. 6 shows a fuel cell or a fuel cell system FIG. 7 shows an electrode unit with a layer system, an FIG. 8 schematically shows a redox flow cell having an electrode unit.

DETAILED DESCRIPTION

Figure 1:
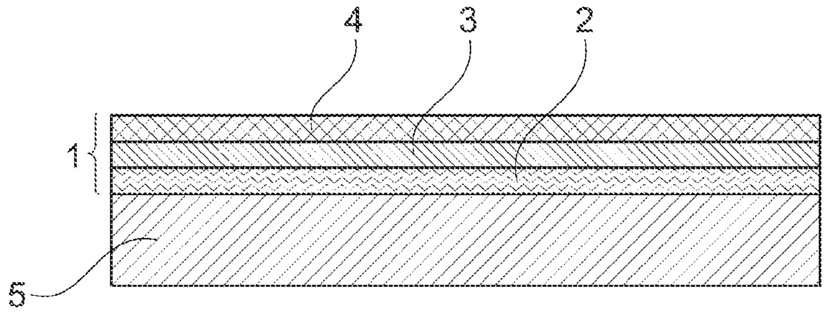
FIGS. 1 to 8 are intended to exemplify layer systems according to the disclosure and a bipolar plate formed therewith as well as fuel cell and electrode unit and a redox flow cell. In the figures.

FIG. 1 shows, in a sectional view, an exemplary embodiment of a first layer system 1 according to the disclosure on a metallic substrate 5. A first layer 2 made of a TiNb alloy is located on the substrate 5. A second layer 3 made of TiNbN or TiNbCN is located on the first layer 2. On the second layer 3 there is at least one cover layer 4 made of ta-C:H (dopant X=hydrogen) and/or ta-C:H:O (dopants X=hydrogen and oxygen) or ta-C:H:O:Si (dopants X=hydrogen and oxygen and silicon).

Figure 2:
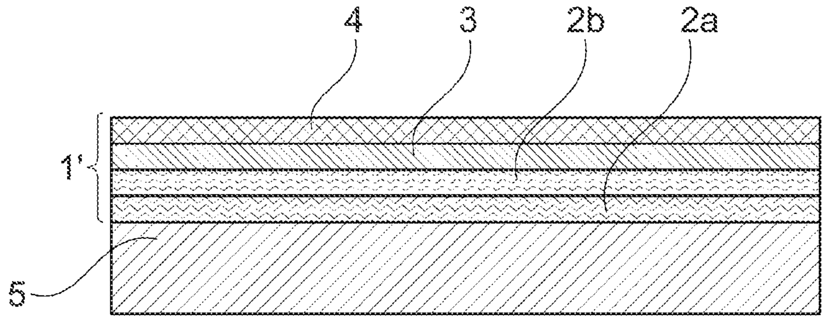

FIG. 2 shows, in a sectional view, an exemplary embodiment of a second layer system 1' according to the disclosure on a metallic substrate 5. On the substrate 5 there is a first layer 2*a* made of titanium and a further first layer 2*b* made of a TiHf alloy. A second layer 3 made of TiHfN or TiHfCN is located on the further first layer 2*b*. On the second layer 3 there is a cover layer 4 made of ta-C:Ir (dopant X=iridium) or ta-C:Ru (dopant X=ruthenium).

Figure 3:
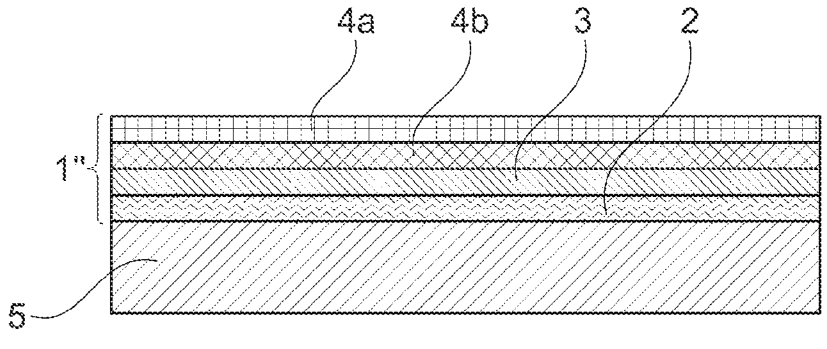

FIG. 3 shows, in a sectional view, an exemplary embodiment of a third layer system 1" according to the disclosure on a metallic substrate 5. A first layer 2 made of titanium is located on the substrate 5. A second layer 3 made of TiBN is located on the first layer 2. A first cover layer 4*a* made of ta-C:B (dopant X=boron) is located on the second layer 3. A second cover layer 4*b* made of ta-C:Ta (dopant X=tantalum) is located on the first cover layer 4*a*. Alternatively, the first and the second cover layer 4*a*, 4*b* can be applied alternately and each in a number n>2.

Figure 4:
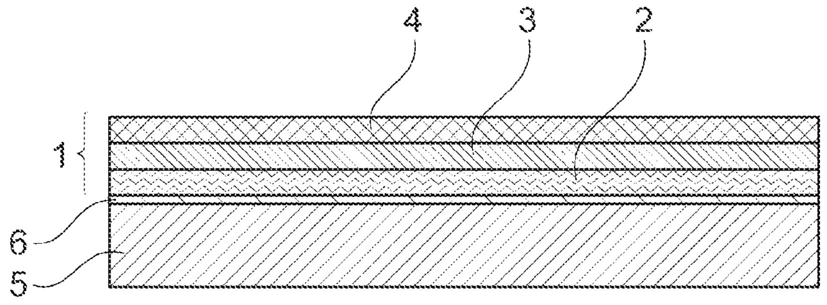

FIG. 4 shows, in a sectional view, an exemplary embodiment of a fourth layer system 1 according to the disclosure on a metallic substrate 5 which has a gas diffusion layer 6. A first layer 2 made of a TiNb alloy is located on the gas diffusion layer 6. A second layer 3 made of TiNbN or TiNbCN is located on the first layer 2. On the second layer 3 there is at least one cover layer 4 made of ta-C:H (dopant X=hydrogen) and/or ta-C:H:O (dopants X=hydrogen and oxygen) or ta-C:H:O:Si (dopants X=hydrogen and oxygen and silicon).

Figure 5:
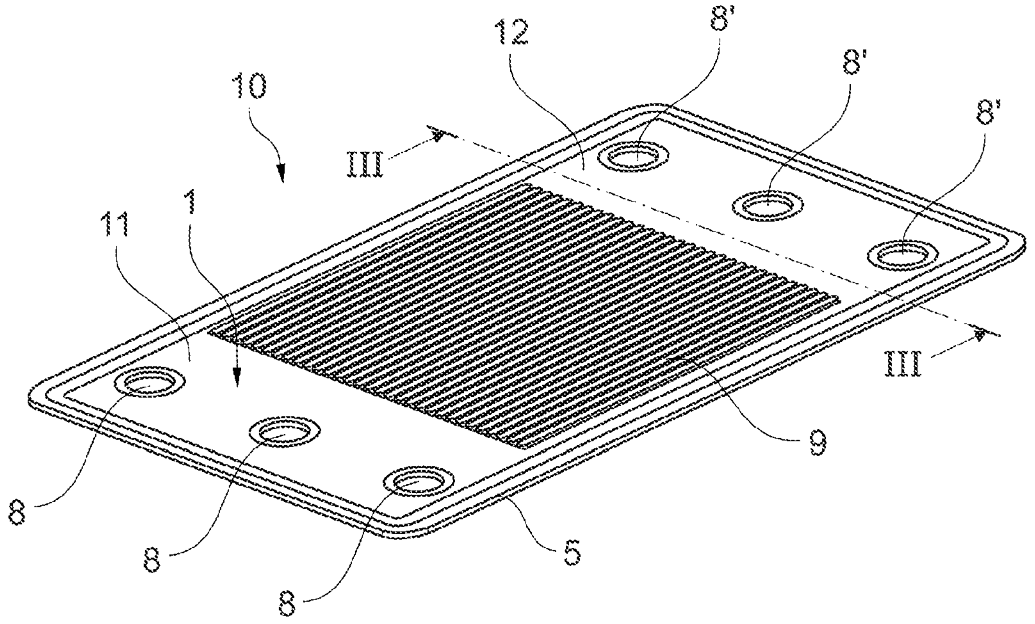
Figure 6:
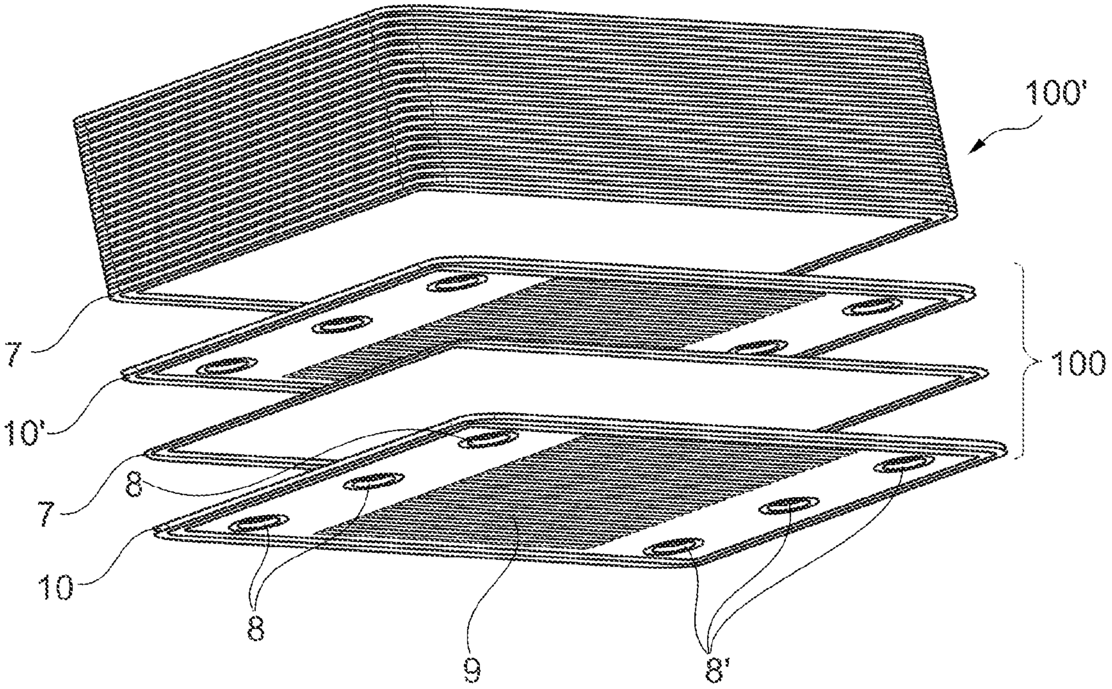

FIG. 5 shows a bipolar plate 10 having a layer system 1, which here has a metallic substrate 5 or a metallic carrier plate made of stainless steel. The layer system 1 covers the bipolar plate 10 on both sides. The layer system 1 has a total thickness in the range of 20 nm to 5 μm. The bipolar plate 10 has an inflow region 11 with openings 8 and an outlet region 12 with further openings 8' which are used to supply a fuel cell with process gases and to remove reaction products from the fuel cell. The bipolar plate 10 also has a gas distribution structure 9 on each side, which for FIG. 6 schematically shows a fuel cell system 100' comprising a plurality of fuel cells 100. Each fuel cell 100 comprises a polymer electrolyte membrane 7 which is adjacent to both sides of bipolar plates 10, 10'. The same reference symbols as in FIG. 5 indicate identical elements.

Figure 7:
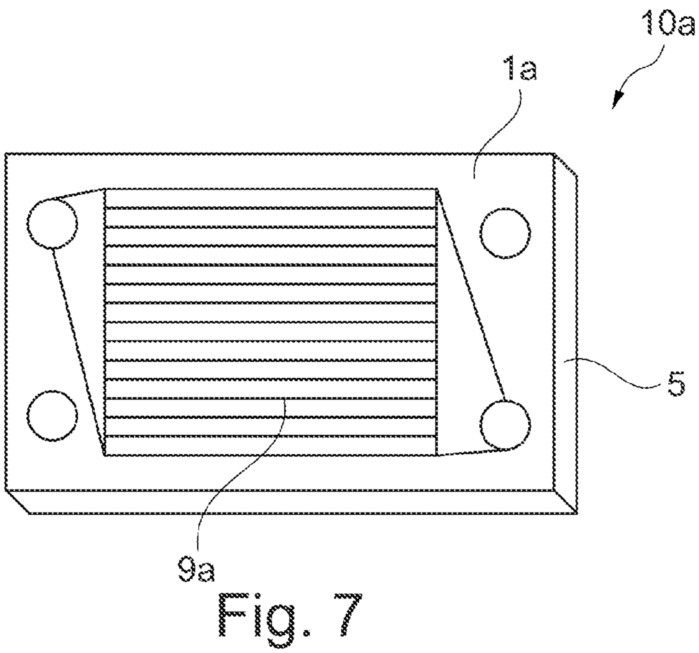

FIG. 7 shows an electrode unit 10*a* in a three-dimensional view comprising a metallic substrate 5 and a layer system 1*a* on the substrate 5. A flow field 9*a* is embossed into the substrate 5, so that a three-dimensional structuring of the surface of the electrode unit 10*a* results.

Figure 8:
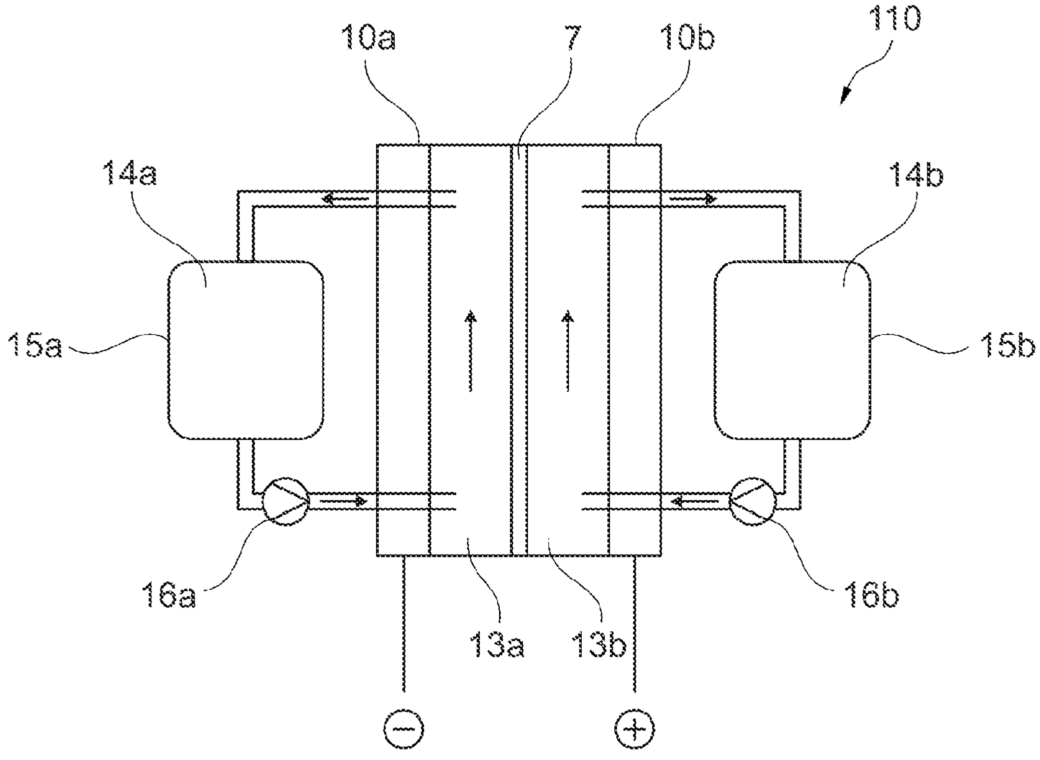

FIG. 8 schematically shows a redox flow cell 110 or a redox flow battery having a redox flow cell 110. The redox flow cell 110 comprises two electrode units 10*a*, 10*b*, a first reaction space 13*a* and a second reaction space 13*b*, wherein each reaction space 13*a*, 13*b* is in contact with one of the electrode units 10*a*, 10*b*. The electrode units 10*a*, 10*b* each have a flow field 9*a* which is arranged facing the respective adjacent reaction space 13*a*, 13*b*. The layer system 1*a* (see FIG. 7) covers the surface in contact with the reaction space 13*a*, 13*b* with the flow field 9*a* of the substrate 5 of the respective electrode unit 10*a*, 10*b*. The reaction spaces 13*a*, 13*b* are separated from one another by a polymer electrolyte membrane 7. A liquid anolyte 14*a* is pumped from a tank 15*a* via a pump 16*a* into the first reaction space 13*a* and passed between the electrode unit 10*a* and the polymer electrolyte membrane 7. A liquid catholyte 14*b* is pumped from a tank 15*b* via a pump 16*b* into the second reaction space 13*b* and passed between the electrode unit 10*b* and the polymer electrolyte membrane 7. An ion exchange takes place across the polymer electrolyte membrane 7, wherein electrical energy is released due to the redox reaction at the electrode units 10*a*, 10*b*.

LIST OF REFERENCE SYMBOLS

1, 1', 1", 1*a* Layer system
2, 2*a*, 2*b* First layer

3 Second layer
4, 4*a*, 4*b* Cover layer
5 Metallic substrate
6 Gas diffusion layer
7 Polymer electrolyte membrane
8, 8' Opening
9 Gas distribution structure
9*a* Flow field
10, 10' Bipolar plate
10*a*, 10*b* Electrode unit
11 Inflow region
12 Outlet region
13*a*, 13*b* Reaction space
14*a* Anolyte
14*b* Catholyte
15*a*, 15*b* Tank
16*a*, 16*b* Pump
100 Fuel cell
100' Fuel cell system
110 Redox flow cell

The invention claimed is:

1. A layer system for coating a bipolar plate or an electrode unit, the layer system comprising:

at least one first layer, at least one second layer; and more than one cover layer arranged on the at least one second layer that is made of doped, tetrahedral amorphous carbon ta-C:X having predominantly $sp^3$-hybridized bonds, wherein the $sp^3$-hybridized proportion in the cover layers is more than 50%, wherein as a dopant X at least one element is provided from the group comprising:

titanium, niobium, tungsten, zirconium, tantalum, hafnium, molybdenum, copper, silicon, platinum, palladium, ruthenium, iridium, silver, boron, nitrogen, phosphorus, fluorine, hydrogen, or oxygen, and the dopant X is provided in each cover layer in a concentration of >0 to 20 at. %, wherein adjacent cover layers contain at least one different dopant X of the group; and wherein a first cover layer and a second cover layer are applied alternately and each in a number n>2.

2. The layer system according to claim 1, wherein the at least one first layer is a metallic layer that is formed from at least one element from the group comprising: titanium, niobium, hafnium, zirconium, or tantalum.

3. The layer system according to claim 2, wherein the at least one first layer is formed from a titanium-niobium alloy.

4. The layer system according to claim 3, wherein the titanium-niobium alloy has a niobium content in the range from 20 to 60 at.-%.

5. The layer system according to claim 1, wherein the at least one second layer is a metallic layer doped with at least one non-metal and formed from at least one element from the group comprising: titanium, niobium, hafnium, zirconium, or tantalum, and wherein the at least one non-metal is formed by at least one element from the group comprising: nitrogen, carbon, fluorine, boron, hydrogen, or oxygen.

6. The layer system according to claim 1, wherein at least one of the at least one first layer or the at least one second layer have a layer thickness in a range from 20 nm to 900 nm.

7. The layer system according to claim 1, wherein the at least one cover layer has a layer thickness in a range from 5 nm to 4.5 μm.

8. A bipolar plate having an anode side and a cathode side, the bipolar plate comprising:

a metallic substrate and the layer system according to claim 1, having a structure of the bipolar plate in the following order: the metallic substrate, the at least one first layer, the at least one second layer, and the at least one cover layer.

9. A fuel cell, comprising at least one of the bipolar plates according to claim 8.

10. The fuel cell according to claim 9, further comprising at least one polymer electrolyte membrane.

11. The fuel cell of claim 9, wherein the fuel cell is an oxygen-hydrogen fuel cell.

12. The bipolar plate of claim 8, wherein the at least one first layer includes at least two first layers and the at least one second layer includes at least two second layers and wherein the first and second layers are provided in an alternating arrangement of the first layers and the second layers.

13. An electrode unit, comprising:

a metallic substrate and the layer system according to claim 1, having a structure of the electrode unit in the order:

a metallic substrate, the at least one first layer, the at least one second layer, and the at least one cover layer.

14. The electrode unit of claim 13, wherein the at least one first layer includes at least two first layers and the at least one second layer includes at least two second layers, and wherein the first and second layers are provided in an alternating arrangement of the first layers and the second layers.

15. The layer system according to claim 1, wherein at least one, two or three elements of the at least one element is provided from the group comprising silicon, boron, nitrogen, phosphorus, fluorine, hydrogen, oxygen.

16. The layer system according to claim 1, wherein the at least one element is provided from the group comprising titanium, niobium, tungsten, zirconium, tantalum, hafnium, molybdenum, copper, silicon, platinum, palladium, ruthenium, iridium, silver.

17. An electrolyser, comprising at least one of the bipolar plates according to claim 8.

18. The layer system according to claim 1, wherein at least one of the cover layers is made of ta-C:X and the dopant X is formed from hydrogen or oxygen and is provided in an amount in the range of 0.1 to 10 at. %.

19. The layer system according to claim 18, wherein at least one of the cover layers is made of ta-C:X and the dopant X is formed from tantalum or iridium or ruthenium and is provided in an amount in the range of 0.1 to 20 at. %.

20. The layer system according to claim 1, wherein at least one of the cover layers is made of ta-C:X and the dopant X is formed from tantalum or iridium or ruthenium and is provided in an amount in the range of 0.1 to 20 at. %.

* * * * *